United States Patent

Miyazawa et al.

[11] Patent Number: 6,070,139
[45] Date of Patent: *May 30, 2000

[54] BIFURCATED SPEAKER SPECIFIC AND NON-SPEAKER SPECIFIC SPEECH RECOGNITION METHOD AND APPARATUS

[75] Inventors: Yasunaga Miyazawa; Mitsuhiro Inazumi; Hiroshi Hasegawa; Isao Edatsune; Osamu Urano, all of Suwa, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/699,874

[22] Filed: Aug. 20, 1996

[30] Foreign Application Priority Data

Aug. 21, 1995 [JP] Japan .................................... 7-212250

[51] Int. Cl.[7] .................................................. G10L 15/28
[52] U.S. Cl. .......................................... 704/275; 704/270
[58] Field of Search .................................... 704/246, 251, 704/256, 270, 275, 201

[56] References Cited

U.S. PATENT DOCUMENTS

| | | |
|---|---|---|
| 2,338,551 | 1/1944 | Stanko . |
| 3,610,831 | 10/1971 | Moshier . |
| 4,052,568 | 10/1977 | Jankowski . |
| 4,305,131 | 12/1981 | Best . |

(List continued on next page.)

FOREIGN PATENT DOCUMENTS

| | | |
|---|---|---|
| 0 281 160 | 9/1988 | European Pat. Off. . |
| 0 318 858 | 6/1989 | European Pat. Off. . |
| 0 362 840 | 4/1990 | European Pat. Off. . |
| 0 374 604 | 6/1990 | European Pat. Off. . |
| 0 510 632 | 10/1992 | European Pat. Off. . |
| 62-253093 | 11/1987 | Japan . |

(List continued on next page.)

OTHER PUBLICATIONS

C. Iooss, From Lattices Of Phonemes To Sentences: A Recurrent Neural Network Approach, International Joint Conference on Neural Networks, Jul. 8–14, 1991, vol. 2, pp. 833–838.

A.N. Michel, et al., Associative Memories Via Artificial Neural Networks, IEEE Control Systems Magazine, Apr. 1990, pp. 6–17.

(List continued on next page.)

Primary Examiner—Krista Zele
Assistant Examiner—Michael N. Opsasnick

[57] ABSTRACT

Bifurcated speaker specific and non-speaker specific method and apparatus is provided for enabling speech-based remote control and for recognizing the speech of an unspecified speaker at extremely high recognition rates regardless of the speaker's age, sex, or individual speech mannerisms. A device main unit is provided with a speech recognition processor for recognizing speech and taking an appropriate action, and with a user terminal containing specific speaker capture and/or preprocessing capabilities. The user terminal exchanges data with the speech recognition processor using radio transmission. The user terminal may be provided with a conversion rule generator that compares the speech of a user with previously compiled standard speech feature data and, based on this comparison result, generates a conversion rule for converting the speaker's speech feature parameters to corresponding standard speaker's feature information. The speech recognition processor, in turn, may reference the conversion rule developed in the user terminal and perform speech recognition based on the input speech feature parameters that have been converted above.

18 Claims, 9 Drawing Sheets

U.S. PATENT DOCUMENTS

| | | |
|---|---|---|
| 4,319,085 | 3/1982 | Welch et al. . |
| 4,336,421 | 6/1982 | Welch et al. . |
| 4,947,482 | 8/1990 | Brown . |
| 4,984,177 | 1/1991 | Rondel et al. .................. 395/2.86 |
| 5,014,219 | 5/1991 | White . |
| 5,040,215 | 8/1991 | Amano et al. . |
| 5,046,019 | 9/1991 | Basehore . |
| 5,054,082 | 10/1991 | Smith et al. ..................... 395/2.84 |
| 5,086,385 | 2/1992 | Launey et al. .................. 364/188 |
| 5,093,899 | 3/1992 | Hiraiwa . |
| 5,119,469 | 6/1992 | Alkon et al. . |
| 5,150,323 | 9/1992 | Castelaz . |
| 5,163,111 | 11/1992 | Baji et al. ........................... 395/2 |
| 5,175,794 | 12/1992 | Tattersall . |
| 5,182,794 | 1/1993 | Gasperi et al. . |
| 5,185,848 | 2/1993 | Aritsuka et al. . |
| 5,218,668 | 6/1993 | Higgins et al. . |
| 5,247,584 | 9/1993 | Krogmann . |
| 5,255,342 | 10/1993 | Nitta . |
| 5,263,097 | 11/1993 | Katz et al. . |
| 5,278,944 | 1/1994 | Sasaki et al. . |
| 5,285,522 | 2/1994 | Mueller . |
| 5,285,523 | 2/1994 | Takahashi . |
| 5,297,237 | 3/1994 | Masuoka et al. . |
| 5,307,444 | 4/1994 | Tsuboka . |
| 5,357,596 | 10/1994 | Takebayashi et al. ............ 395/2.84 |
| 5,377,301 | 12/1994 | Rosenberg et al. .............. 395/2.31 |
| 5,377,305 | 12/1994 | Russo . |
| 5,384,892 | 1/1995 | Strong . |
| 5,444,673 | 8/1995 | Mathurin . |
| 5,459,815 | 10/1995 | Aikawa et al. ................... 395/2.63 |
| 5,481,644 | 1/1996 | Inazumi . |
| 5,548,681 | 8/1996 | Gleaves et al. . |
| 5,562,453 | 10/1996 | Wen . |
| 5,577,164 | 11/1996 | Kaneko et al. . |
| 5,664,059 | 9/1997 | Zhao ................................ 701/254 |
| 5,668,929 | 9/1997 | Foster, Jr. . |
| 5,704,009 | 12/1997 | Cline et al. . |

FOREIGN PATENT DOCUMENTS

| | | |
|---|---|---|
| 2-81160 | 3/1990 | Japan . |
| 3-265077 | 11/1991 | Japan . |
| 4-295894 | 10/1992 | Japan . |
| 4-295897 | 10/1992 | Japan . |
| 6-4097 | 1/1994 | Japan . |
| 6-119476 | 4/1994 | Japan . |

OTHER PUBLICATIONS

M. Sompolinsky, et al., Chaos In Random Neural Networks, Physical Review Letter, Jul. 18, 1988, pp. 259–262.

M. Palakal, et al., Speaker–Invarient Pheneme Recognition Using Multiple Neural Network Models, 1991 IEEE International Conference on Neural Networks, Jul. 8–11, 1991, pp. 839–844.

J.A. Naylor, et al., The Application Of Neural Networks To Wordspotting, 1992 26$^{th}$ Asilomar Conference on Signals, Systems & Computers, Oct. 26–28, pp. 1081–1085.

K.P. Li, et al, A Whole Word Recurrent Neural Network For Keyword Spotting, ICASSP, Mar. 1992, pp. II–81 to II–84.

N.Z. Hakim, et al., Cursive Script Online Character Recognition With A Recurrent Neural Network Model, IJCNN, Jun. 1992, pp. III–777 to III–716.

J. Hertz, Introduction To The Theory Of Neural Computation, Santa Fe Institute Studies In The Sciences Of Complexity, Lecture Notes, vol. 1, Addison–Wesley, 1991, pp. 172–187.

J. Hwang, et al., Interactive Query Learning For Isolated Speech Recognition, Sp. 1992, IEEE, pp. 93–94.

A. Hirai, et al., Phoneme–Based Word Recognition By Neural Ntwork—A Step Toward Large Vocabulary Recognition, IEEE, Jun. 1990, pp. III–671, to III–676.

A. Waibel, et al., Modularity And Scaling In Large Phoenemic Neural Networks, IEEE Transactions On Acoustics, Speech And Signal Processing, vol. 37. No. 12, Dec. 1989, pp. 1888–1898.

A. Baloch, et al., A Neural System For Behavioral Conditioning Of Mobile Robots, IJCNN International Joint Conference On Neural Networks, San Diego, Jun. 17–21, 1990, pp. II–723 to II–728.

T. Robinson, et al., A Recurrent Error Propagation Network Speech Recognition System, 8300 Computer Speech & Language 5, (1991), Jul. No. 3, London, GB; pp. 259–274.

Y. Bengio, et al., Learning The Dynamic Nature Of Speech With Back–Propagation For Sequences, 8221 Pattern Recognition Letters 13 (1992) May, No. 5, Amsterdam, NL, pp. 375–385.

T. Tanaka, A Complex Sequence Recognition Model, IJCNN International Joint Conference On Neural Networks, Baltimore, MD, Jun. 7–11, 1992, vol. 4, pp. IV–201 to IV–207.

T. Watanabe, et al., Study Of Learning Methods And Shape Of The Learning Surface For Recurrent Neural Networks, Teses by IEICE, vol. J74D–II, No. 12, Dec. 25, 1991, pp. 1776–1787.

M. Inazumi, et al., Continuous Spoken Digit Recognition By Recurrent Neural Networks, Technical Report of IEICE, SP92–125, Jan. 19, 1993, pp. 17–24.

M. Inazumi, et al., Connected Word Recognition By Recurrent Neural Networks, Technical Report Of IEICE, SP–92–25, Jun. 30, 1992, pp. 9–16.

K. Funahashi, On The Recurring Neural Networks, Technical Research Report By IEICE, SP–92–80, Oct. 21, 1992, pp. 51–58.

Y. Fukuda, et al., Phoeneme Recognition Using Recurrent Neural Networks, Technical Research Report By IEICE, NC92–10, May 8, 1991, pp. 71–78.

T. English, et al., Back–Propagation Training Of A Neural Network For Word Spotting, ICASSP, vol. 2, Mar. 23–26, 1992, San Francisco, CA, US, pp. 357–360.

Z. Zhao, Connectionist Training Of Non–Linear Hidden Markov Models For Speech Recognition, IJCNN, 1991, vol. 2, Nov. 18–21, 1991, Singapore, SG, pp. 1647–1652.

F. Greco, et al., A Recurrent Time–Delay Neural Network For Improved Phoneme Recognition, ICASSP, 1991, vol. 1, May 14–17, 1991, Toronto, Canada, pp. 81–84.

H.U. Bauer, et al., Nonlinear Dynamics Of Feedback Multilayer Perceptrons, Physical Review A, vol. 2, No. 4, Aug. 15, 1990, US, pp. 2401–2408.

T. Robinson, A Real–Time Recurrent Error Propagation Network Word Recognition System, ICASSP–92, vol. 1, Mar. 23–26, 1992, pp. 617–620.

FIG.-4A
USER'S SPEECH FEATURE VECTOR SEQUENCE (1) | 3 | 2 | 0 | 0 | 0 |  A
(2) | 2 | 1 | 1 | 1 | 1 |  B
(3) | 1 | 2 | 1 | 1 | 1 |  B
(4) | 0 | 0 | 2 | 2 | 2 |  C
(5) | 0 | 0 | 0 | 2 | 3 |  C

FIG.-4B
INPUT SPEAKER'S CODEBOOK CREATED IN ADVANCE

| 2 | 2 | 0 | 0 | 0 |  A
| 1 | 1 | 1 | 1 | 1 |  B
| 0 | 0 | 0 | 2 | 2 |  C

FIG.-4C
STANDARD SPEAKER'S CODEBOOK

| 5 | 5 | 1 | 1 | 1 |  A'
| 2 | 2 | 3 | 2 | 2 |  B'
| 0 | 1 | 3 | 3 | 3 |  C'

FIG.-4D
A'
B'
B'
C'
C'

BIFURCATED SPEAKER SPECIFIC AND NON-SPEAKER SPECIFIC SPEECH RECOGNITION METHOD AND APPARATUS

CROSS REFERENCE TO RELATED APPLICATIONS

This application is related to copending application Ser. No. 08/700,181, filed on the same date as the present application, Attorney's docket no. P2503a, entitled "Voice Activated Interactive Speech Recognition Device And Method", and copending application Ser. No. 08/700,175, filed on the same date as the present application, Attorney's docket no. P2504a, entitled "A Cartridge-Based Interactive Voice Recognition Method And Apparatus", all commonly assigned with the present invention to the Seiko Epson Corporation of Tokyo, Japan. This application is also related to the following copending applications: application Ser. No. 08/078,027, filed Jun. 18, 1993, entitled "Speech Recognition System"; application Ser. No. 08/102,859, filed Aug. 6, 1993, entitled "Speech Recognition Apparatus"; application Ser. No. 08/485,134, filed Jun. 7, 1995, entitled "Speech Recognition Apparatus Using Neural Network and Learning Method Therefor"; and application Ser. No. 08/536,550, filed Sep. 29, 1996, entitled "Interactive Voice Recognition Method And Apparatus Using Affirmative/Negative Content Discrimination"; all commonly assigned with the present invention to the Seiko Epson Corporation of Tokyo, Japan.

BACKGROUND OF THE INVENTION

1. Field of the Invention

The invention generally relates to speech recognition devices, and is particularly concerned with improving recognition rates thereof through use of hybrid speaker-specific and non-speaker specific phrase matching and normalization techniques.

2. Description of the Related Art

Speech recognition devices can be generally classified into two types. The first type is the specific-speaker speech recognition device that only recognizes the speech of a specific speaker, and the second type is the non-specific speaker speech recognition device that can recognize the speech of non-specific speakers.

In the case of a specific speaker speech recognition device, a specific speaker first registers his or her speech signal patterns as reference templates by entering recognizable words or phrases one at a time according to a specified interactive procedure. After this registration, when the speaker issues one of the registered words, speech recognition is performed by comparing the feature pattern of the entered word to the registered speech templates. One example of this kind of interactive speech recognition device is a speech recognition toy. The child who uses the toy pre-registers about 10 phrases such as "Good morning," "Good night" and "Good day," for example, as multiple speech instructions. In practice, when the speaker says "Good morning," his speech signal is compared to the speech signal of the registered "Good morning." If there is a match between the two speech signals, an electrical signal corresponding to the speech instruction is generated, which then makes the toy perform a specified action.

As the name implies, of course, this type of specific speaker speech recognition device can recognize only the speech of a specific speaker or speech possessing a highly similar pattern. Furthermore, since the phrases to be recognized must be registered one at a time as part of device initialization, the procedure is quite daunting and cumbersome.

By contrast, a non-specific speaker speech recognition device creates feature patterns data of the recognition target phrases described above, using the speech issued by a large number (e.g., around 200) of speakers, and stores (registers) this data in advance. Speech issued by a non-specific speaker is then compared to these pre-registered recognizable phrases for recognition and is particularly concerned with voice-based activation of such instruments.

Although such non-specific speech recognition devices can achieve relatively high recognition rates for "typical" voices, they cannot always achieve high recognition rates for all types of voices speech features and linguistic variations within a given language. For example, the voice characteristics vary widely depending on the age and sex of the speaker, such as a toddler, an adult, a woman, and a man. In some cases, a speech recognition device may be able to achieve extremely high recognition rates for adults' voices but may fail miserably with toddlers' voices.

Furthermore, this type of speech recognition device may also be used in automatic vending machines. For example, if such a device is used in an automatic ticketing machine, it becomes possible to buy tickets at railway stations, various facilities, restaurants, etc. by simply entering voice commands. If such a system could be implemented, cumbersome operations such as having to check fee tables for correct amounts and pressing the correct buttons would be eliminated, enabling senior citizens, children, or physically handicapped people to buy tickets quite with relative ease.

However, many problems do stand in the way of commercial implementation. That is, this type of speech recognition device must be capable of recognizing the voice of a non-specific speaker at extremely high recognition rates, regardless of the differences in the characteristic due to the speaker's age, sex, or individual speech mannerisms.

OBJECTS OF THE INVENTION

It is, therefore, an object of the invention to solve the above-mentioned problems, to enable voice-activated remote control, and to recognize the voice of a non-specific speaker at extremely high recognition rates, regardless of the differences in the speech features due to the speaker's age, sex, or individual speech mannerisms.

SUMMARY OF THE INVENTION

In accordance with these and related objects, speech recognition according to the present invention involves a bifurcated approach utilizing a satellite terminal for accomplishing user interaction and, where appropriate, speaker-specific word conversion tasks in tandem with a main recognition unit for interpreting what was perceived by the terminal unit utilizing non-specific speaker word recognition (i.e. comparing the sounds perceived by the terminal unit against speech feature reference templates associated with a list of pre-registered words and using contextual rules in order to establish a meaning) and carrying out one or more actions in response to the perceived speech. To this end, according to the first embodiment of the present invention, the user terminal portion of the speech recognition system will include speech capture and analysis units in combination with a conversion rule generator for establishing and comparing the terminal user's perceived speech against the standard voice features obtained from a selection of preregistered words stored within or made accessible to the terminal unit. Preferably, these pre-registered words will be already preselected from a range of typical speakers, and could be complimented with the specific speaker's own set of registered words, especially in situations where the terminal unit is contemplated to be the personal property of the speaker (e.g. incorporated into the speaker's personal digital assistant ("PDA")).

Once the conversion rule generator makes the comparison between the perceived speech and terminal word registry, it develops a conversion rule useful in highlighting audible variations between the perceived speech and corresponding entries in the word registry, including volume variations. Then, a speech feature parameter converter normalizes the perceived speech to standard speaker features based on this developed conversion rule. Thereafter, the terminal unit broadcasts the normalized perceived speech, preferably via an on-board radio frequency communications unit to the main unit for recognition, interpretation, and response activities.

The main unit includes a second communications unit for receiving the converted perceived speech from the remote terminal. Once received, this speech is routed to a phrase detector for recognizing keywords preferably through consulting a local standard speech feature table corresponding to a predefined, non-specific speaker word registry. In turn, the main unit phrase detector generates word detection data which may comprise a time-dependent word lattice and routes this information to the speech comprehension controller for interpretation and responsive action generation activities.

Preferably using a pre-stored list of contextual rules associated with the aforementioned word registry, the speech comprehension controller attempts to glean a meaning from the phrase detection data. And, if a meaning or context is discovered, directs that a suitable response be synthesized and/or appropriate action be taken, should the perceived speech be classified as a command instruction, for example.

Moreover, conversion rule, non-specific speaker information, and/or speaker-specific information may be stored in a removable memory storage medium such as a cartridge and removably attached to and in communication with the terminal unit to enable the aforementioned speech recognition functionality. By externalizing and modularizing this potentially speaker-specific adaptive processing, a wider range of potential speakers and applications may be accommodated with a common terminal unit merely through a cartridge swap.

In an alternative embodiment, the speech input and speech analysis units may be relocated from the satellite terminal to the main unit, particularly where terminal cost or lack of terminal speech input/capture functionality is concerned. If so, the characteristic converter will also be repositioned within the main recognition unit. However, the satellite terminal retains the individualized conversion rule information and activities, along with specific/non-specific speaker speech characteristic data mentioned above, potentially in removable cartridge media form, in order to accommodate the broadest range of potential speakers or users. Moreover, a bidirectional communications link is maintained between the terminal and main units, with the main unit transmitting perceived speech to the terminal for conversion rule comparison and generation operations. Then, the terminal unit responds with generated conversion rule information for subsequent use by the main unit feature parameter converter and subsequent speech recognition processing.

In a further alternative embodiment, the user terminal only includes speech capture and analysis (digitization) functionality. Accordingly, the feature parameter converter, along with conversion rule information and specific/nonspecific speaker speech feature patterns mentioned above, are preferably housed in removable cartridge media form and removably positioned within the main detection unit. This configuration represents the potentially cheapest alternative in terms of satellite terminal cost and simplicity in terminal design, with the side benefit of less-stringent remote communication requirements. However, main recognizer unit structure and functionality is more complex, and support for cartridge-based speaker and/or application-specific characteristic and conversion information and processing may not be as conveniently implemented.

In operation, the techniques and devices according to the present invention enable data exchange between the user terminal and main recognizing and implementing unit, preferably using wire-free radio transmission. Therefore, speech-activated remote control becomes possible. Furthermore, this satellite user terminal area may, at least, compares the speech of a user with pre-stored speech feature reference templates and that, based on this comparison result, generates a conversion rule for normalizing the particular speaker's speech feature idiosyncrasies, such as volume variations, to a standardized speaker's feature pattern, and can retain the generated conversion rule for future use in an adaptive manner. As such, since the device main unit may reference this conversion rule and perform speech recognition based on, e.g. the speech feature vector volume of the input speech that has been normalized to the speech feature vector sequence of the standard speech, extremely high recognition rates can be achieved regardless of age, sex, or individual speech mannerism.

Furthermore, conversion generation, non-specific and/or specific speaker recognition, comparison and storage operations may be provided in a removable cartridge form. Consequently, a single terminal or device can be used by multiple users merely by changing cartridges.

Other objects and attainments together with a fuller understanding of the invention will become apparent and appreciated by referring to the following description of specific, preferred embodiments and appending claims, taken in conjunction with the accompanying drawing:

BRIEF DESCRIPTION OF THE DRAWINGS

In the drawings, wherein like reference symbols refer to like parts:

FIGS. 4A–4D diagrammatically illustrate perceived speech conversion to standard speech feature vector sequences according to the first embodiment;

DESCRIPTION OF THE PREFERRED EMBODIMENTS

Figure 1:
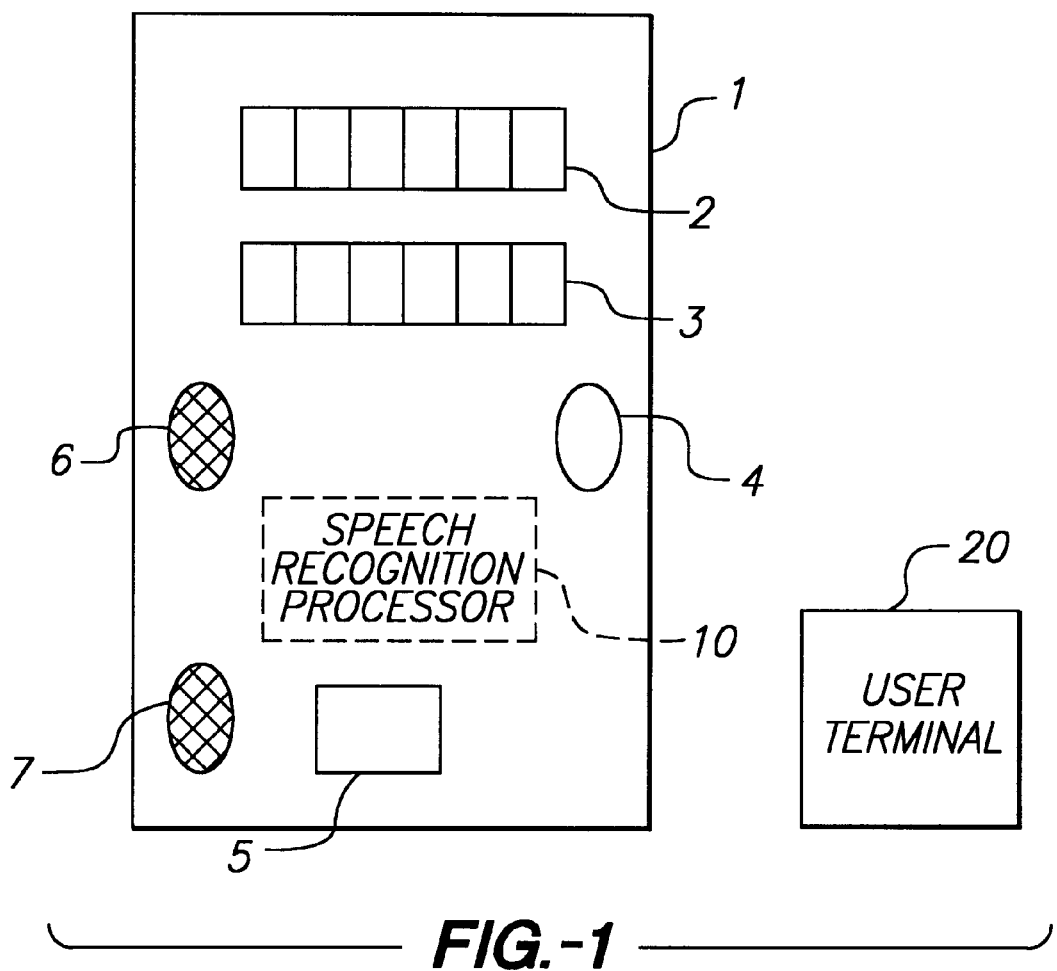
FIG. 1 is an overall block diagram of a two-stage speech recognition device according to the present invention.

The first embodiment illustrates application of the present invention to a food ticket-vending or order-taking machine. FIG. 1 explains the overall schematic configuration of this embodiment, which comprises speech recognition processor 10 (detail to be explained hereinbelow) contained inside ticketing machine (device main unit) 1, and personalized user terminal area 20 (detail to be explained below). Data is exchanged between the user terminal area 20 and speech recognition processor 10, using conventional radio transmission techniques and protocols. As in an ordinary vending machine, the exterior of ticketing machine 1 is provided with display area 2 showing the available menu, price display area 3, money deposit area 4, and change discharge area 5, in addition to speech input unit 6, and speech output unit 7, etc. Since the areas such as the ticket-issuing mechanism of this ticketing machine are not directly related to the essence of this invention, the explanation of their configurations and functions is omitted herein.

Figure 2:
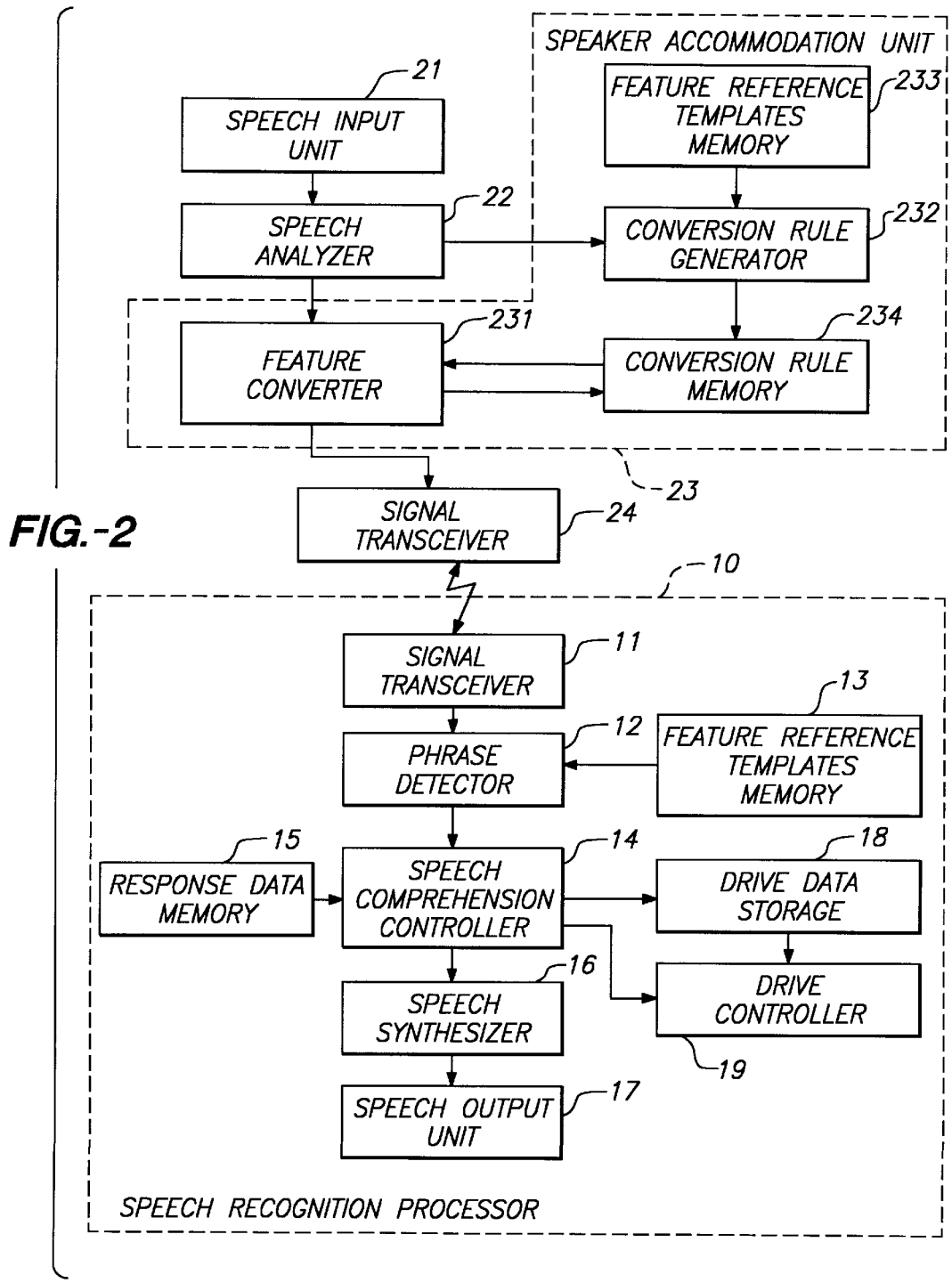
FIG. 2 is a more-detailed block diagram of FIG. 1, illustrating the first embodiment of the present invention.

FIG. 2 is a block diagram for explaining the configurations of speech recognition processor 10 and user terminal 20 according to the first embodiment. In this embodiment, user terminal 20 comprises speech input unit 21, speech analyzer 22, speaker accommodation unit 23 (detail to be explained hereinbelow), and signal transceiver 24. Speech recognition processor 10 comprises complementary signal transceiver 11, phrase detector 12, speech feature reference templates memory 13, speech comprehension controller 14, response data memory 15, speech synthesizer 16, speech output unit 17 (equivalent to speech output unit 7 shown in FIG. 1), drive data storage 18, and drive controller 19, etc. Since this embodiment shows a case in which speech input unit 21 is provided on user terminal unit 20, speech input unit 6 of device main unit 1 is not needed when user terminal 20 is used.

An explanation follows below of the functions of the individual components mentioned above, as well as overall speech recognition processing.

Although not shown in the FIG. 2, speech input unit 21 generally comprises a microphone, an amplifier, a lowpass filter, and an A/D converter, and the speech input from the microphone is first passed through the amplifier and the lowpass filter and converted into an appropriate sound waveform. This waveform is then converted into a digital signal (e.g., 12 KHz, 16 bits) by the A/D converter and relayed to speech analysis unit 22. Speech analysis unit 22 uses a preprogrammed processing unit (CPU) to analyze at short intervals the frequency of the waveform signal sent from speech input unit 21, then extracts the multi-dimensional feature vector that expresses the frequency characteristics (here, LPC-CEPSTRUM coefficients are normally used), and outputs the time series (hereafter referred to as "feature vector array") corresponding to this feature vector.

In this embodiment, speaker accommodation unit 23 generally comprises feature converter 231, conversion rule generator 232, speech feature reference templates 233, and conversion rule memory 234. The speech feature reference templates 233 is a ROM or EEPROM device that stores or registers the feature patterns of the recognizable phrases (called registered phrases), prepared in advance using voices spoken by a large number (200+) of representative speakers.

Speaker accommodation unit 23 receives the digitized perceived voice information output from the speech analyzer 22, converts the feature parameters of the input speech to the feature parameters of a standard speaker, and then outputs the result through signal transmission area 24. In other words, based on the speech of the user who owns this user terminal area 20, conversion rule generation area 232 generates the conversion rule in advance using the data in speech feature reference templates memory 233, and stores this conversion rule in conversion rule storage area 234. When the user's speech is input, it is analyzed by speech analyzer 22, and the feature parameters that have been analyzed are input into feature converter 231. Feature converter 231 converts the feature parameters that have been sent to the feature pattners of a standard speaker based on the conversion rule stored in conversion rule storage area 234, and sends the converted feature parameters to the speech recognition processor 10 via signal transmission area 24.

Figure 3:
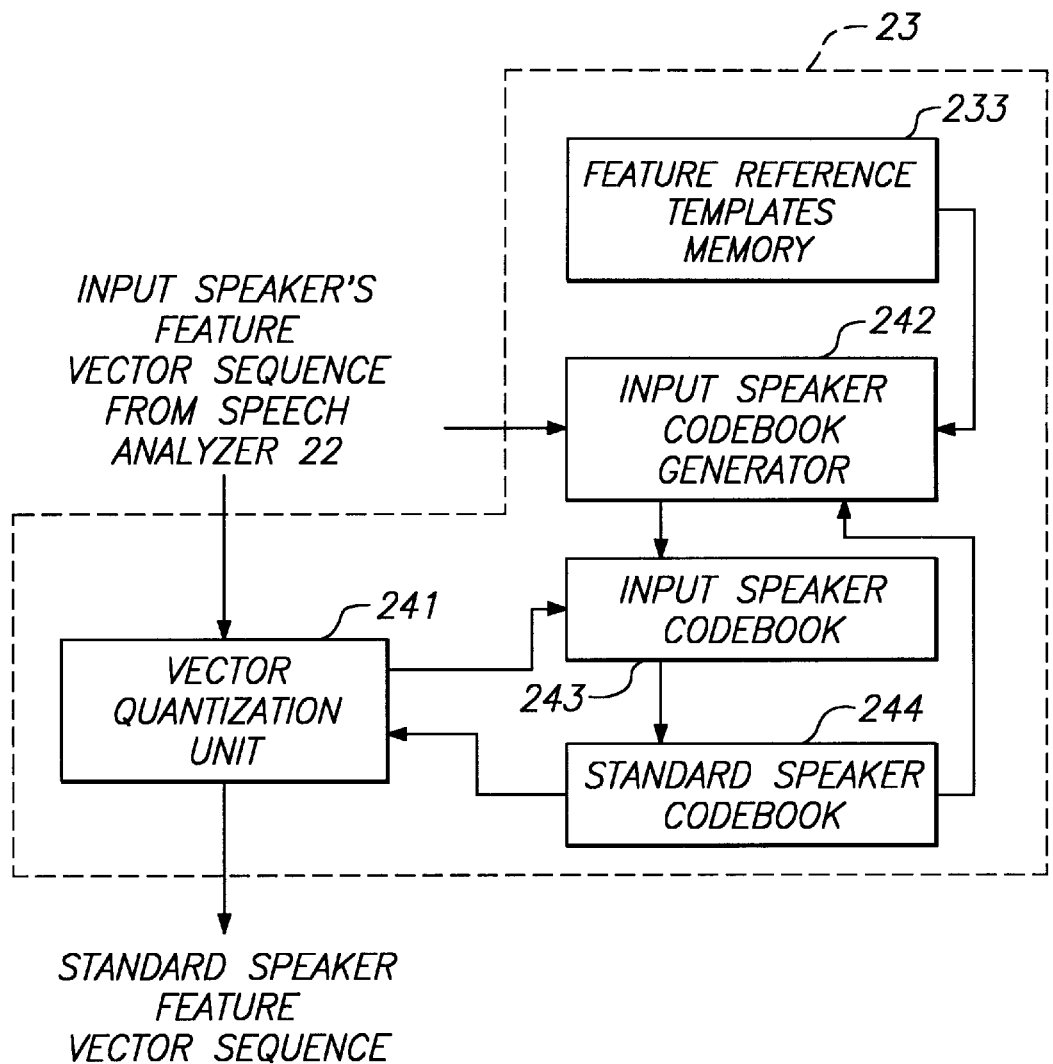
FIG. 3 is a more detailed block diagram of FIG. 2, illustrating an alternate speaker accommodation unit according to the first embodiment.

A specific example speaker accommodation unit 23 is shown in FIG. 3, which comprises vector quantization unit 241, input speaker codebook generator 242, speech feature reference templates memory 233, input speaker codebook 243, and standard speaker codebook 244. In FIG. 3, vector quantization unit 241 is functionally equivalent to feature parameter converter 231 in FIG. 2, input speaker codebook generator 242 is equivalent to conversion rule generator 232, and input speaker codebook 243 and standard speaker codebook 244 are equivalent to conversion rule storage memory 234. The process of converting the feature parameters of the input speech to the feature patterns of a standard speaker will be explained using FIG. 3.

First, input speaker codebook generator 242 is used to generate the input speaker codebook in advance. This is accomplished by the user entering several of the recognizable phrases one by one. Suppose that "Ohayoo" [Good morning] is one of the recognizable phrases. When "Ohayoo" is entered, the sound for this "Ohayoo" is analyzed by speech analyzer 22, and its feature vector sequence is entered in input speaker codebook generator 242. This sequence is then compared with the data inside speech feature reference templates 233, and the differences in the speech features are used for creating a mapping function for mapping the codebook of the standard speaker to the speech feature space of the input speaker. Since the precision of this mapping function improves if it is created using multiple phrases, multiple phrases are used in this embodiment.

Using the mapping function thus obtained, the codebook for a user is created by mapping the standard speaker codebook onto the speech feature space of the input speaker. When that user's speech is input, it is converted to a standard speaker's feature vector sequence based on the input speaker codebook and the standard speaker codebook, and is then output. This process is explained by example using FIGS. 4A–4D. FIG. 4A shows the user's speech feature vector sequence that was input, FIG. 4B shows the user's codebook created in advance as explained earlier, and FIG. 4C shows the standard speaker's codebook. FIG. 4D shows the resultant standard speaker feature vector sequence mapped from the input voice feature vector sequence.

Although an input speech feature vector sequence normally approaches a 10 dimensional vector, a 5-dimensional vector sequence is used here for the sake of simplicity in explanation. Furthermore, although a relatively large codebook size (256 or 512 registered patterns), is normally used as an entry codebook, a three deep codebook is shown herein, for the sake of simplicity in explanation. Correspondence is pre-established between the data of the input speaker codebook and the data of the standard speaker codebook. For example, data A in the input speaker codebook corresponds to data A' in the standard speaker codebook; data B in the input speaker codebook corresponds to data B' in the standard speaker codebook; and data C in the input speaker codebook corresponds to data C' in the standard speaker codebook.

In this way, the user's input speech is analyzed by speech analyzer 22, and the 5-dimensional feature vector sequence is output as a time series as shown in FIG. 4A.

Distance calculation is used to determine to which data in the input speaker codebook shown in FIG. 4B these input feature vector sequences shown in FIG. 4A (1), (2), (3), . . . are the closest. For example, it is determined that data (3·2·0·0·0) of input speech (1) is closest to data A (2·2·0·0·0) in the input speaker's codebook, data (2·1·1·1·1) of input speech (2) is closest to data B (1·1·1·1·1) in the input speaker's codebook, data (1·2·1·1·1) of input speech (3) is closest to data B (1·1·1·1·1) in the input speaker's codebook, data (0·0·2·2·2) of input speech (4) is closest to data C (0·0·0·2·2) in the input speaker's codebook, and data (0·0·0·2·3) of input speech (5) is closest to data C (0·0·0·2·2) in the input speaker's codebook.

The closest feature vector is selected in this way by referencing the input speaker codebook for each piece of data in the input speech. Therefore, in this case, a characteristic vector A·B·B·C·C is obtained if input speeches (1) through (5) are considered.

Since A, B, and C in the input speaker codebook correspond to A', B', and C' in the standard speaker codebook, respectively, in this case, the input speech is converted to data A'·B'·B'·C'·C' of the standard speaker codebook, as shown in FIG. 4D. Note that the standard speaker codebook in this case contains data A'(5·5·1·1·1·), data B'(2·2·3·2·2), and data C'(0·1·3·3·3).

In this way, the feature vector sequence of the input speech can be converted to the characteristic vector sequence of the standard speaker's codebook, and this converted characteristic vector sequence is sent from signal transmission unit 24 to speech recognition processor 10 of the device main unit.

Incidentally, user terminal 20 explained above should be owned by or individualized for an individual (as an integrated part of a wrist watch or as a PDA, for example). Each user creates his/her own input speaker codebook in advance. In this way, a user who owns user terminal 20 can walk up to food ticketing machine (device main unit) 1, for example, and say "I would like one curry," for example, to user terminal 20. This speech is then input through speech input unit 21, and after it is analyzed by speech analyzer 22, the feature parameters developed as a vector sequence are converted by speaker accommodation unit 23 to a standard speaker's feature vector sequence using the codebook created from the user's own speech, and is sent to speech recognition processor 10 of the device main unit.

Next, the processing by the speech recognition processor 10 will be explained. Like standard speech feature reference templates 233 provided in the speaker accommodation unit, speech feature reference templates memory 13 is preferably a ROM or EEPROM device that stores (registers) the standard feature patterns of the recognizable phrases (called registered phrases), typically prepared in advance using voices spoken by a large number of people (around 200 people, for example) for individual phrases. Since a food ticketing machine is used as an example here, the number of registered phrases is around 10 which matches the number of items on the menu, of which "Curry," "Soba [buckwheat noodle]," and "Udon [wheat vermicelli]".

Although not shown in the figure, phrase detector 12 mainly comprises processing unit (CPU) and a ROM device storing the CPU's processing program, and is used for determining the location in the input speech and the certainty at which phrases registered in speech feature templates memory 13 are encountered. Hidden Markov Model (HMM) or DP matching can be used by phrase detector 12 for keyword-spotting processing as is well-known in the art. However, according to the present invention, keyword-spotting processing technology using the dynamic recurrent neural network (DRNN) method is used, as disclosed by Applicants in U.S. application Ser. No. 08/078,027, filed Jun. 18, 1993, entitled "Speech Recognition System", commonly assigned with the present invention to Seiko-Epson Corporation of Tokyo, Japan, which is incorporated fully herein by reference. Also, this method is disclosed in the counterpart laid open Japanese applications H6-4097 and H6-119476. DRNN is used here in order to perform voice recognition of virtually continuous speech by non-specific speakers and to output word detection data as described herein.

The specific operation of this phrase detector 12 will be briefly explained with reference to FIGS. 5A–5E. Although a food ticketing machine is used in this embodiment of the invention, a general input speech example, instead of speech recognition specifically related to ticketing or meal-ordering, will be used for explaining phrase detection processing by phrase detector 12 in FIGS. 5A–5E, along with the processing action of speech comprehension controller 14.

Figure 5A:
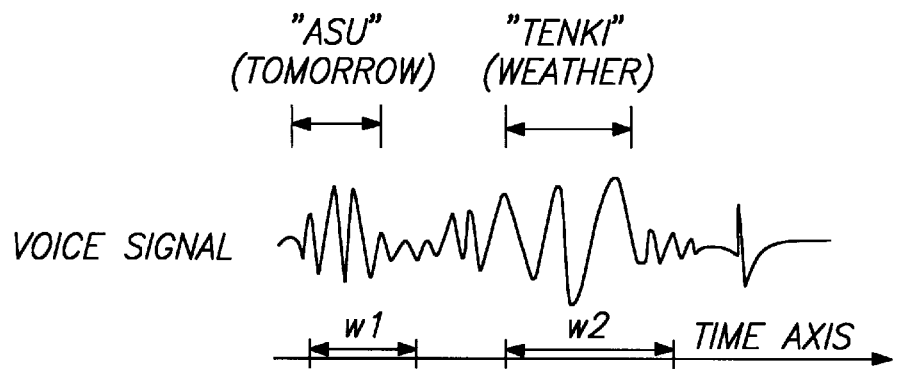
FIGS. 5A–5E diagramatically illustrate sample input voice wave form and resultant partial word lattice generation for explaining phrase detection by the phrase detector and speech recognition by the speech comprehension controller according to the present invention.

Phase detector determines the confidence level at which a word or phrase registered in the speech feature reference templates memory 13 occurs at a specific location in the input voice. Now, suppose that the speaker inputs an example Japanese language phrase "asu no tenki wa . . . " meaning "Concerning tomorrow's weather". Assume that in this case the stylized voice signal shown in FIG. 5A represents the time domain audio waveform for this expression.

In the expression "asu no tenki wa . . . ", the contextual keywords include "asu" (tomorrow) and "tenki" (weather). These are stored in the form of feature patterns or vector series in standard speech characteristic memory 13 as parts of the a predetermined word registry, which in this case, represents approximately 10 different phrases. If 10 words or phrases are registered, signals are output in order to detect keywords corresponding to these 10 phrases (designated phrase 1, phrase 2, phrase 3 . . . up to phrase 10). From the information such as detected signal values, the phrase detector determines the confidence level at which the corresponding words occur in the input voice.

Figure 5B:
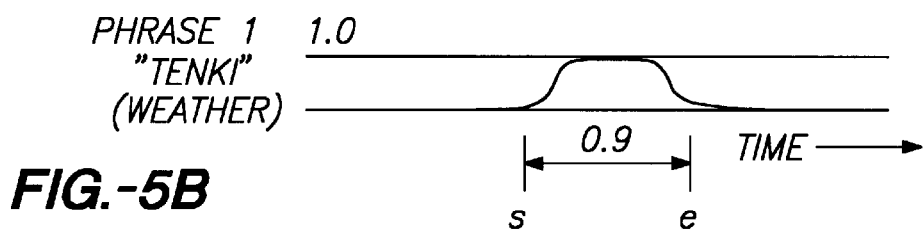
Figure 5C:
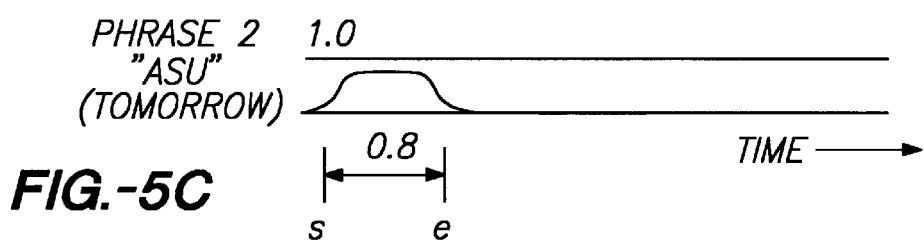
Figure 5D:
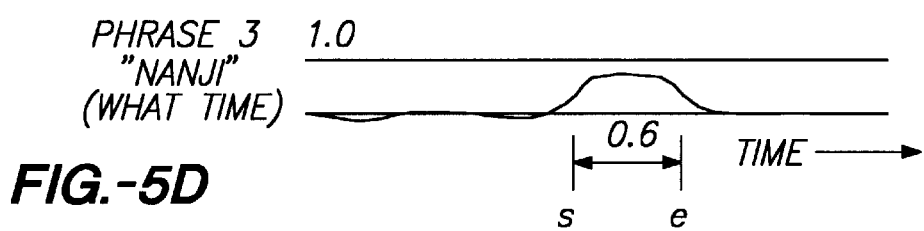
Figure 5E:
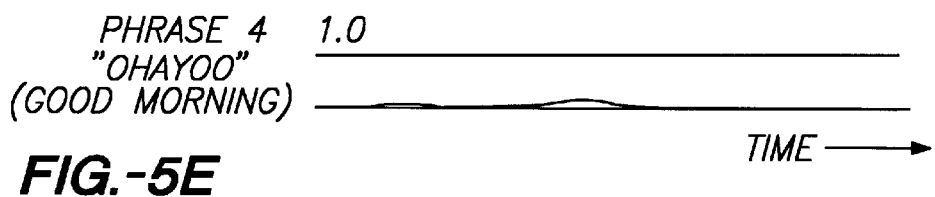

More specifically, if the word "tenki" (weather) occurs in the input voice as phrase 1, the detection subunit that is waiting for the signal "tenki" (weather) issues a detection signal which rises at the portion "tenki" in the input voice, as shown in FIG. 5B. Similarly, if the word "asu" (tomorrow) occurs in the input voice as word 2, the detection subunit that is waiting for the signal "asu" rises at the portion "asu" in the input voice, as shown in FIG. 5C. In FIGS. 5B and 5C, the numerical values 0.9 and 0.8 indicate respective confidence levels that the spoken voice contains the particular pre-registered keyword. The relative level or magnitude of this level can fluctuate between ~0 and 1.0, with 0 indicating a nearly zero confidence match factor and 1.0 representing a 100% confidence match factor. In the case of a high confidence level, such as 0.9 or 0.8, the registered word having a high confidence level can be considered to be a recognition candidate relative to the input voice. Thus, the registered word "asu" occurs with a confidence level of 0.8 at position w1 on the time axis. Similarly, the registered word "tenki" occurs with a confidence level of 0.9 at position w2 on the time axis.

Also, the example of FIGS. 5A–5E show that, when the word "tenki" (weather) is input, the subunit that is waiting for phrase 3 (phrase 3 is assumed to be the registered word "nanji" ("What time . . . ") also issues a detection signal which rises at position w2 on the time axis with a relatively uncertain confidence level of approximately 0.6. Thus, if two or more registered words exist as recognition candidates at the same time relative to an input voice signal, the recognition candidate word is determined by one of two methods: either by 1)selecting the potential recognition candidate exhibiting the highest absolute degree of similarity to the input voice using confidence level comparisons as the actually recognized keyword; or by 2) selecting one of the words as the recognized word utilizing a predefined correlation table expressing context rules between words. In this case, the confidence level for "tenki" (weather) indicates that it has the highest absolute degree of similarity to the input voice during time portion w2 on the time axis, even though "nanji" could alternatively be recognized as a potential recognition candidate. Based on these generated confidence levels, the comprehension controller performs the recognition of input voices.

Collectively, the detection information, including starting and ending points on the time axis and the maximum magnitude of the detection signal indicating the confidence level, for each pre-registered word contained in non-specific speaker word registry within reference templates 13 is known as a word lattice. In FIGS. 5B–5E, only a partial lattice is shown for the sake of clarity, but a word lattice including detection information for every pre-registered non-specific word or phrase is, in fact, generated by the phrase detector 12.

Though not shown in FIG. 2, comprehension controller 14 is principally composed of a processor and ROM that stores the processing program for performing the processing tasks described below.

Incidentally, to implement the above process in a food ticketing machine, phrases such as Curry, "Soba" (buckwheat noodle), and "Udon" (wheat vermicelli) as the names of the saleable items and their numbers can be designated as keywords; and if the user says "I would like one curry," for example, to terminal area 20 he or she owns, "Curry" and "one" are detected as keywords; and the device main unit can be set up such that it will recognize continuous speech such as "I would like one curry" based on these keywords, and will respond with "You would like one curry, correct?".

Speech comprehension controller 14 selects a recognition word output from phrase detector 12. Based on the composite word lattice, the comprehension controller recognizes a voice (comprehending the overall meaning of the input voice), references response data memory 15, also preferably consisting of a ROM or EEPROM device, determines a response according to the comprehended meaning of the input voice, and transmits appropriate response information and control overhead to both speech synthesizer 16 and speech output unit 17.

For example, when the detected data or partial word lattice shown in FIGS. 5B–5E is relayed from phrase detector 12, the comprehension controller determines one or more potential recognition candidates denoted in the word lattice as a keyword occurring in the input. In this particular example, since the input voice is "asu no tenki wa" (the weather tomorrow), the words "asu" (tomorrow) and "tenki" (weather) are detected. From the keywords "asu" and "tenki", the comprehension controller understands the contents of the continuous input voice "asu no tenki wa".

The voice recognition processing of virtually continuous voice by keyword spotting processing, as described above, is applicable to other languages as well as to Japanese. If the language to be used is English, for instance, some of the recognizable words that can be registered might be "good morning", "time", "tomorrow", and "good night". The characteristic data on these recognizable registered words is stored in standard speech characteristic data memory 13. If the speaker asks "What time is it now?", the word "time" in the clause "what time is it now" is used as a keyword in this case. When the word "time" occurs in the input voice, the detection signal that is waiting for the word "time" rises at the portion "time" in the input voice. When detected data (word lattice) from phrase detector 12 is input, one or more words in the input voice is determined as a keyword. Since in this example the input voice is "what time is it now", "time" is detected as a keyword, and the voice recognition conversation control unit understands the contents of the continuous input voice "what time is it now?".

Note that as described hereinabove, separate CPUs can be provided to perform such control functions as speech analysis, phrase detection, speech comprehension interaction control, and speech synthesis. However, in this embodiment, a main CPU is provided for performing all of these processes, and the embodiments will be further explained hereinbelow assuming that this single CPU performs all speech recognition processing within the speech recognition processor 10

In such a configuration, if the user of terminal 20 walks up to food ticketing machine (device main unit) 1, for example, and says "I would like one curry," for example, to user terminal area 20, this speech is input through speech input unit 21, and after it is analyzed by speech analyzer 22, its feature sequence is converted by speaker accommodation unit 23 to a standard speaker's feature vector sequence using the speaker specific and standard speaker codebooks. In other words, the input feature vector sequence analyzed by speech analyzer 22 goes through vector quantization unit 241, is compared with the data contained in input speaker codebook 243, is converted to the pre-matched standard feature vector sequence in standard speaker codebook 244, and is then output via vector quantization unit 241. The input speech signal that has been converted to the standard speaker's feature vector sequence by this vector quantization area 241 is sent from terminal signal transceiver 24, and is received by signal transceiver 11 provided in speech recognition processor 10 inside device main unit 1.

Phrase detector 12 then compares this characteristic vector sequence that has been sent with the data inside standard speech characteristic data memory 13, and outputs phrase detection data (word lattice) to speech comprehension controller 14.

Speech comprehension controller 14 then attempts to understand the meaning of the input speech based on the phrase detection data generated by phrase detector 12. In this case, the input speech is understood as "I would like one curry," and a response content such as "OK, you would like one curry, correct?", for example, is fetched from response data memory 15 and routed to speech synthesizer 16 for speech generation according to well-known techniques. Speech synthesizer 16 receives the signal from speech comprehension controller 14 and synthesizes corresponding speech, and outputs this synthesized response content through speech output unit 17.

If the user responds with "Yes" (assuming that this "Yes" is one of the registered phrases), for example, when the response "OK, you would like one curry, correct?" is received from device main unit 1, speech recognition processor 10 of device main unit 1 recognizes "Yes" in the same way as before. Device main unit 1 then issues the appropriate ticket after verifying that the correct amount of money has been deposited. In specific terms, speech comprehension controller 14 references drive data storage area 18 and sends the corresponding drive data to drive controller 19. The drive control area receives the instruction from speech comprehension controller 14 and drives the ticketing mechanism or food selecter, etc. As a result, an order ticket is issued.

Note that the interaction between the user and the device is not limited to those described above. For example, if the user says "Curry," the device may ask "How many?". When the user responds with "One," the device may respond with "Please deposit . . . cents." Therefore, a wide range of content can be predicted and programmed for potential interaction, and is limited only by the memory constraints of the terminal unit 20 and/or recognition processor 10, as will be appreciated by those ordinarily skilled in the computing and communications arts.

As explained above, each user terminal unit 20 that comprises speech input area 21, speech analyzer 22, and speaker accommodation unit 23 is preconfigured to operate with a particular user. The user who owns or possesses this user terminal unit 20 creates a codebook based on the user's own speech in advance, and during the actual usage, the user's speech is converted to the standard speaker's feature vector sequence by referencing this input speaker's codebook, and the resultant characteristic vector sequence is sent to speech recognition processor 10 of the device main unit. Since the device main unit uses the data that has been converted to the standard speech characteristic vector sequence for speech recognition, it can achieve high recognition rates without being affected by the user's voice characteristic or individual speech mannerisms.

Figure 6:
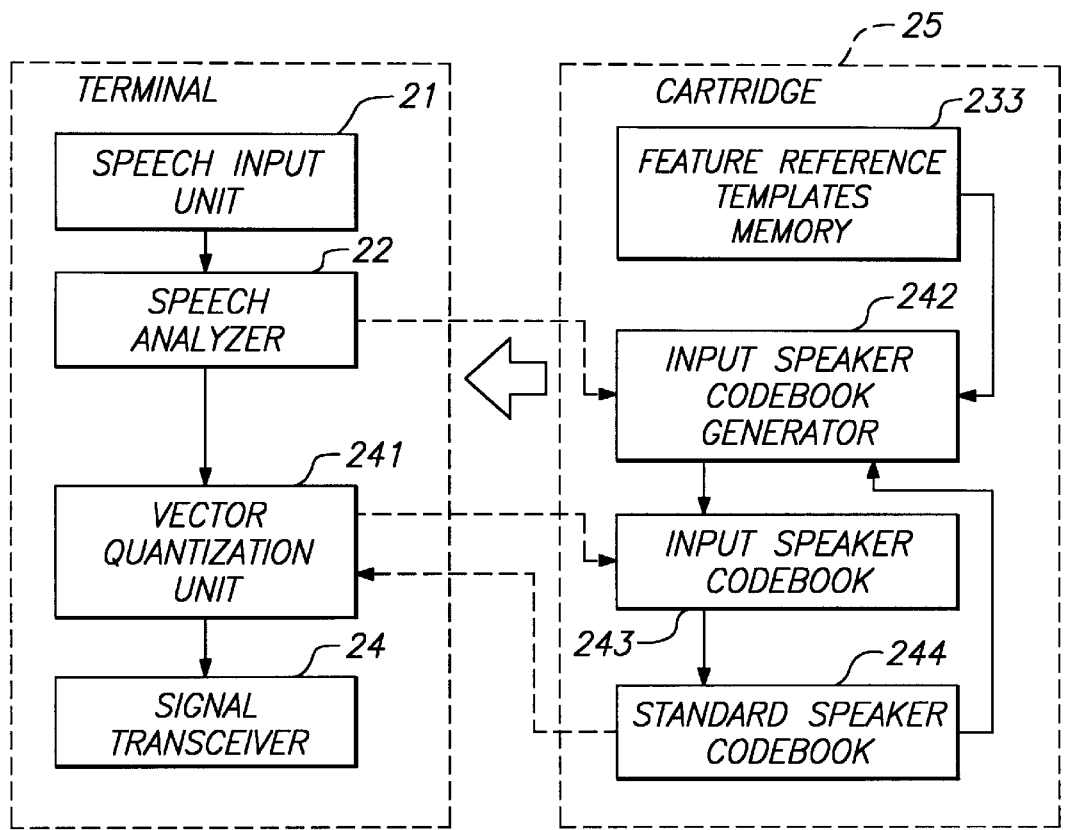
FIG. 6 is a detailed diagram of the user terminal unit according to the first embodiment, illustrating cartridge-based speaker accommodation.

Although speech input unit 21, speech analysis unit 22, and speaker accommodation unit 23 are housed within user terminal 20 in the first preferred embodiment, user terminal 20 is, of course, not limited to such a configuration. For example, input speaker codebook generator 242, speech feature reference templates memory 233, input speaker codebook 243 and standard speaker codebook 244 of speaker accommodation unit 23 can be provided within a removable cartridge, and this cartridge can be individually owned. In other words, if user terminal 20 is provided as general purpose device, for example, speech input unit 21, speech analyzer 22, vector quantization unit 241, and signal transceiver 23 are provided on the terminal unit, and input speaker codebook generator 241, reference templates memory 233, input speaker codebook 243, and standard speaker codebook 244 are relocated to removable cartridge 25, as shown in FIG. 6. When this cartridge 25 is mounted in the terminal's cartridge mounting area (not shown in the figure) they become electrically connected as indicated by dotted lines in FIG. 6, thereby enabling signal exchange and functionality as discussed above.

With such a configuration, cartridge 25 need only be personalized, and the main terminal circuit board that contains speech input unit 21, speech analyzer 22, vector quantization unit 241, and signal transceiver 23 can be shared by several people, making the privately-owned cartridges small, light-weight, and inexpensive to manufacture and design. In this case, the cartridge can be mounted within the terminal unit for generating an input speaker codebook. Note that when using such a cartridge format, reference templates memory 233 need not be provided on cartridge 25, and can be internalized to the terminal unit 20, as the data contained memory 233 is generalized for all users.

Figure 7:
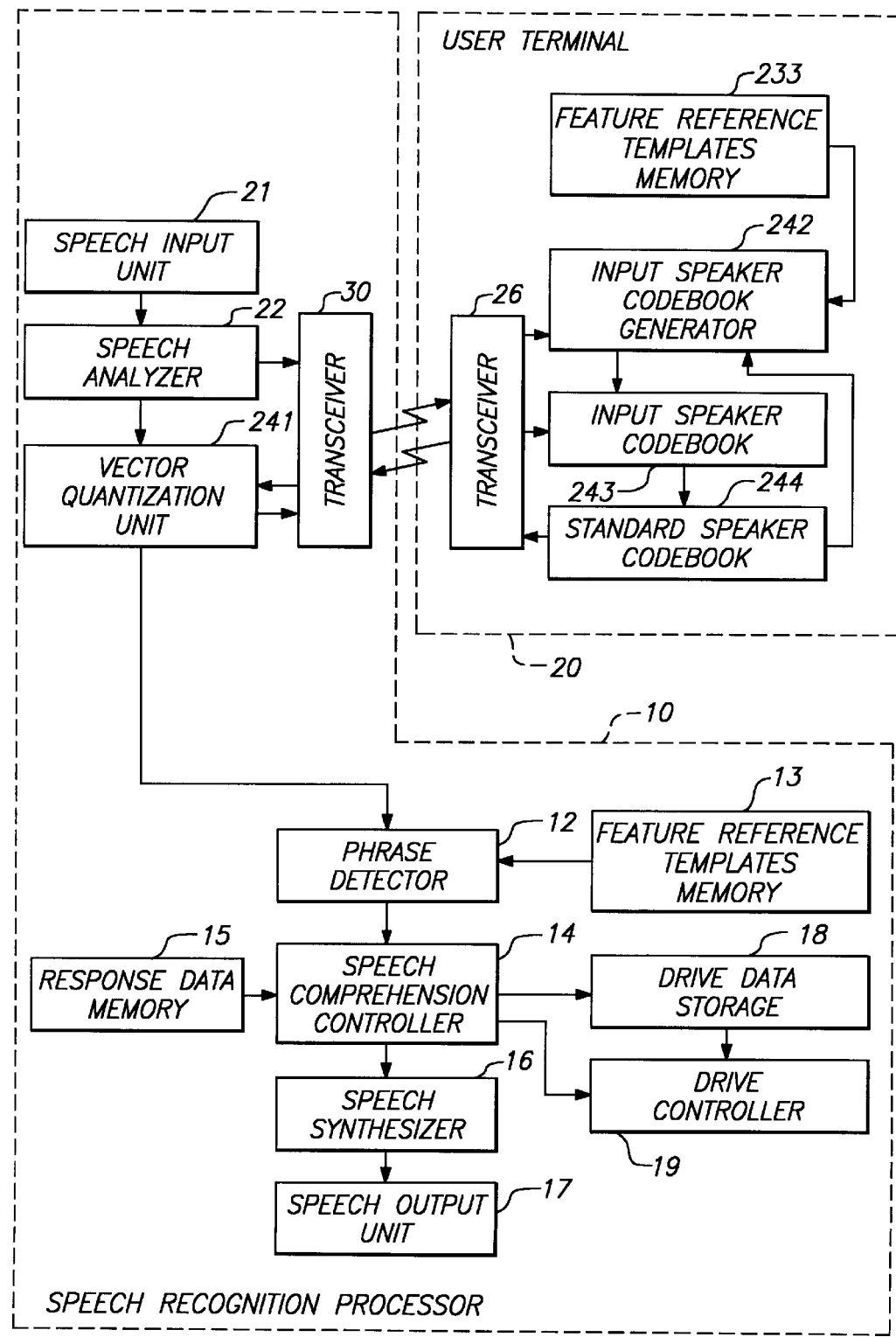
FIG. 7 illustrates a second embodiment of the present invention.

The second preferred embodiment of the invention, is also based on a case in which the invention is applied to a meal ticket vending machine as described hereinabove. In the first embodiment explained above, user terminal unit 20 comprises speech input unit 21, speech analyzer 22, speaker accommodation unit 23, and signal transceiver 24. In contrast, in the second embodiment, speech input unit 21, speech analysis unit 22, and vector quantization unit 241 of speaker accommodation unit 23, etc. are provided in speech recognition processor 10 within the device main unit, and input speaker codebook generator 242, standard speech feature reference templates memory 233, input speaker codebook 243, and standard speaker codebook 244 of speaker accommodation unit 23 are externalized to user terminal unit 20, as shown in FIG. 7. In this case, signal transceiver 30 is provided in speech recognition processing unit 10 of the ticketing machine (device main unit) 1, and terminal transceiver 26 is provided in user terminal unit 20. In FIG. 7, the same numerals are used to denote the same areas as in FIGS. 2 and 3 discussed. Although FIG. 7 shows an example in which reference templates memory data 13 for speech recognition and reference templatesmemory 233 for generating input speaker codebooks are provided separately, they need not necessarily be provided separately. For example, it is possible to use the same reference templates memory 13 when generating an input speaker codebook as is used for phrase detection. However, in such a case, a communication means must be provided for sending the data from template memory 13 to user terminal unit 20, as will become obvious to those ordinarily skilled in the art having knowledge of the present specification.

In such a configuration, the user follows the procedure described below to purchase a ticket. In this case, since user terminal unit 20 has no speech input unit, the user speaks to speech input unit 6 (equivalent to speech input unit 21 in FIG. 7) provided in device main unit 1. After the input speech is analyzed by speech analyzer 22, its feature vector sequence is sent from signal transceiver 30 provided in device main unit 1, and is received by terminal transceiver 26 provided in user terminal unit 20. User terminal unit 20 then sends via terminal transceiver 26, the standard speaker codebook data corresponding to the feature vector sequence of the input speech that has been sent based on comparison with input speaker codebook 243 and the codebook generator 242, as described above. This standard speaker codebook data is received by signal sending/receiving unit 30 provided on the device main unit, and then the normalized speech feature vector sequence which results from the conversion of the input speech feature vector sequence to the standard speaker's feature vector sequence, is output from vector quantization unit 241 and sent back to phrase detector 12.

In the second embodiment, if each user wishes to create an input speaker codebook in user terminal unit 20, he or she takes the user terminal area 20 to ticketing machine 1, sets both user terminal area 20 and ticketing machine 1 to a input speaker codebook generation mode, and enters specified phrases from speech input unit 6 of ticketing machine 1. An input speaker codebook is then generated in the same way as explained in the first embodiment hereinabove. Note that the generation of input speaker codebooks can be performed using a dedicated device, instead of ticketing machine 1.

In such a configuration, if the user who owns user terminal unit 20 walks up to food ticketing machine (device main unit) 1, for example, and says "I would like one curry," for example, to ticketing machine 1, this speech is input through speech input unit 6 (speech input area 21 in FIG. 7) of ticketing machine 1, and after it is analyzed by speech analyzer 22, its feature vector sequence is sent by transceiver 30 by going through vector quantization unit 241, and is received by transceiver 26 of user terminal unit 20. Based on this, input speaker codebook 243 is referenced, and the pre-matched data of standard speaker codebook 244 is sent via terminal transceiver 26, and is received by signal transceiver 30 of ticketing machine 1. Normalized feature vector sequences that have been converted to the standard speaker's feature vector sequences are then output from vector quantization area 241, and sent to phrase detection 12 for further speech recognition processing according to the present invention.

In turn, phrase detector 12 compares the normalized feature vector sequence that has been sent with the data inside reference memory 13, and outputs phrase detection data (word lattice) to speech comprehension controller 14. Speech comprehension controller 14 then attempts to understand the meaning of the input speech based on the phrase detection data from phrase detection area 12 and prestored contextual rules, as explained in the first embodiment above. In this case, the input speech is understood as "I would like one curry," and a response content such as "OK, you would like one curry, correct?", for example, is fetched from response data memory 15 and sent to speech synthesizer 16. Speech synthesizer 16 receives the signal from speech comprehension controller 14 and synthesizes corresponding speech, and outputs this synthesized response content through speech output unit 17.

If the user responds with "Yes" (assuming that this "Yes" is one of the registered phrases), for example, when the response "OK, you would like one curry, correct?" is received from device main unit 1, speech recognition processor 10 of device main unit 1 recognizes "Yes" as discussed previously. Device main unit 1 then issues the appropriate ticket after verifying that the correct amount of money has been deposited.

As explained above, in the second embodiment, each user uses his/her own terminal unit 20 that comprises input personalized versions of speaker codebook generator 242, standard speech feature reference templates memory 233, input speaker codebook 243, and standard speaker codebook 244.

Also, as discussed previously, the user of this user terminal area 20 creates a codebook based on the user's own speech in advance, and during the actual usage, the user's speech is input into the device main unit and analyzed, and the feature parameter vector sequence resulting from this speech analysis is sent to this user terminal unit 20. Personalized user terminal unit 20 then returns the corresponding standard speaker codebook data to the device main unit by referencing the developed input speaker codebook, and the device main unit routes the standard speaker's feature vector sequence to phrase detector 12. Since the device main unit performs speech recognition using the data resulting from the conversion or normalization of the input speech feature vector sequence to the standard speech feature sequence, it can achieve high recognition rates without being affected by the user's voice characteristic or individual speech mannerisms. Consequently, user terminal 20 can be made smaller, lighter in weight, and inexpensive.

Although the invention is applied to a ticketing machine, such as a machine for food tickets, in the explanation of the first and second embodiment hereinabove, it is not limited in its application to automated vending machines, and can naturally be applied to toys and other commonly used electronic instruments. Moreover, although the speech issued by a user is recognized and some phrase is returned in response in the examples shown above, phrase response is not always necessary and some action could be substituted, in response to speech recognition.

In the third embodiment discussed hereinbelow, only speech input unit 21 is separated from the device main unit, and input speech signal is sent from a signal transmission unit and received by a signal receiving unit provided in the device main unit; and then speech recognition is performed through speech analysis and an action is taken based on the recognition result. This embodiment is effective when it is necessary to operate a device from some distance, and for example, can be useful for remote control of a model ship or airplane, in the case of toy applications.

Figure 8:
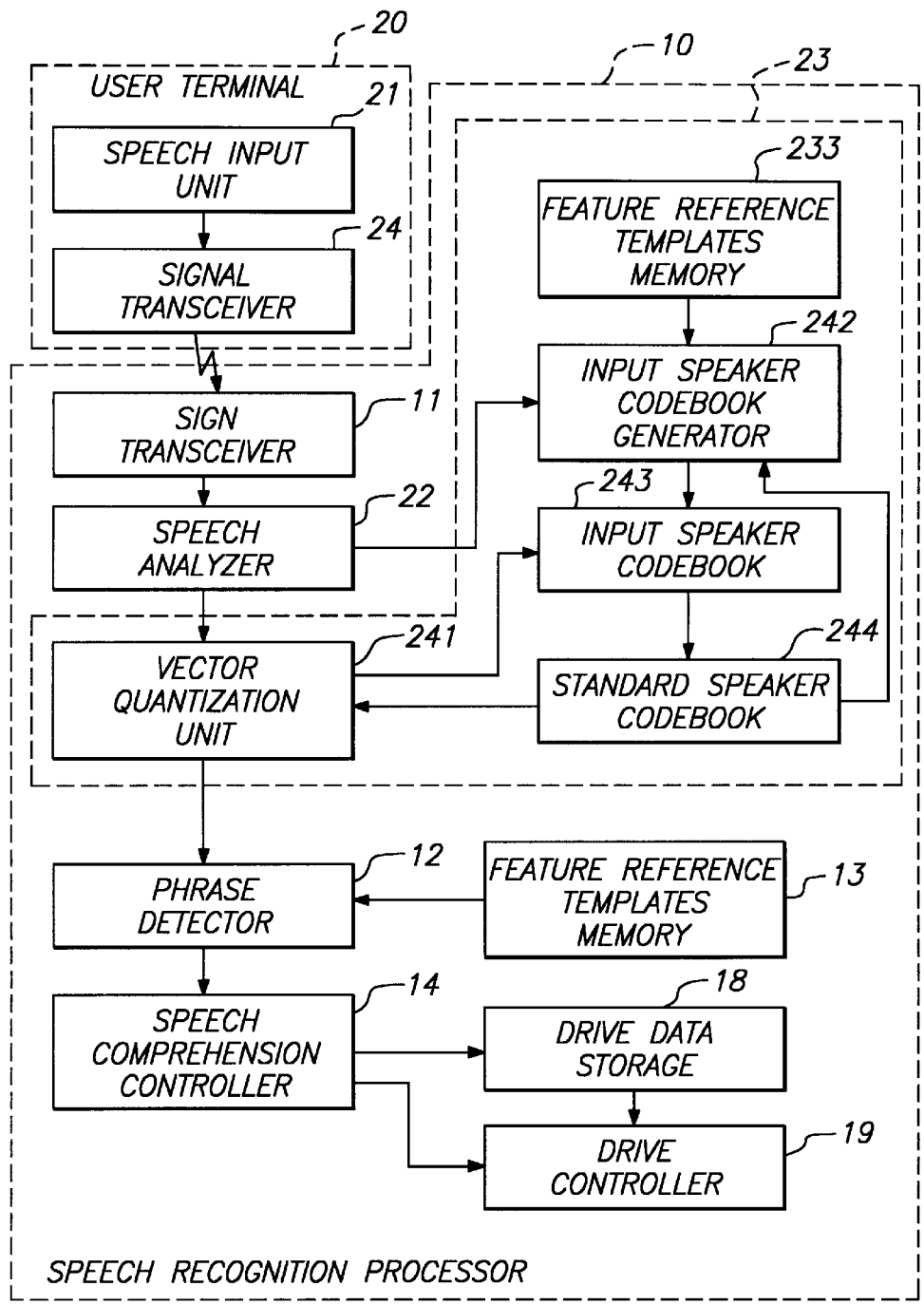
FIG. 8 illustrates a third embodiment of the present invention.

FIG. 8 is a block diagram for explaining the third embodiment in more detail. In this figure, speech recognition processor 10 includes signal receiving unit 11, speech analyzer 22, speaker accommodation unit 23, phrase detector 12, standard speech feature reference template data memory 13, speech comprehension controller 14, drive data storage 18, and drive controller 19, etc. User terminal 20 is provided solely with speech input unit 21 and signal transmission unit 24 for transmitting the speech signal that is input into speech input unit 21, and operates much like a standard analog radio transmitter.

Here, the configurations and functions of speech input unit 21, signal transceiver 24, signal transceiver 11, speech analyzer 22, speaker accommodation unit 23, phrase detector 12, reference template memory 13, speech comprehension controller 14, drive data storage area 18, and drive controller 19, etc. are the same as those explained above. However, outputting of a response using speech is omitted here since it is not necessary to respond using a phrase to the speech that has been recognized in a remote controller application. Using an example of a remote-controllable ship, when the user issues speech containing a recognizable phrase such as "Go straight," "Turn left," or "Stop," speech comprehension controller 14 recognizes the speech, and drive controller 19 performs drive control accordingly based on the instruction from speech comprehension controller 14.

Figure 9:
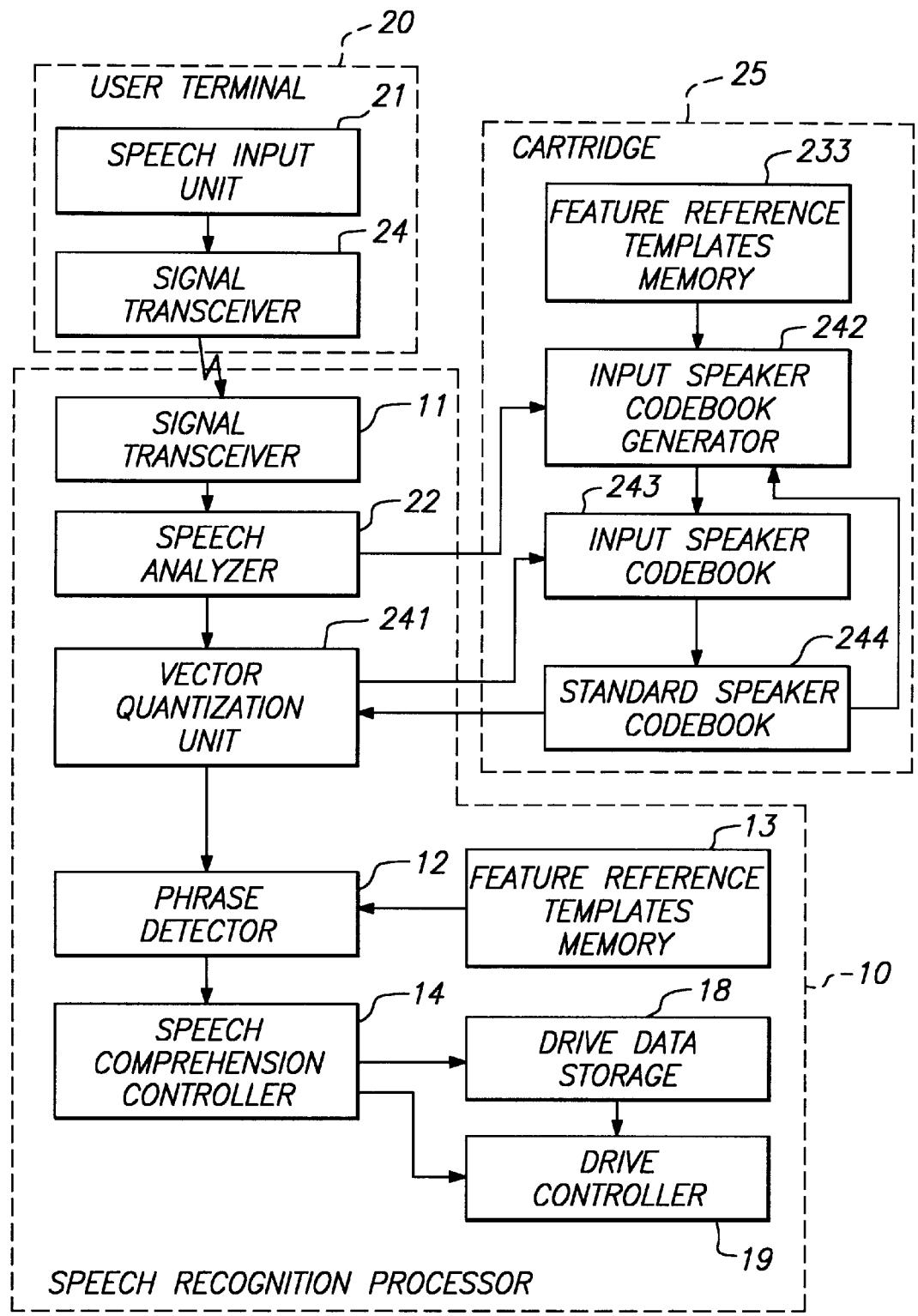
FIG. 9 is a block diagram of a device according to the third embodiment incorporating cartridge-based speaker accommodation.

In this case, the speaker accommodation unit 23 is preferably in a cartridge format, as explained in the first embodiment shown in FIG. 9. In other words, by providing speech recognition processor 10 on the device main unit side with signal transceiver 11, speech analyzer 22, vector quantization unit 241, phrase detector 12, reference templates memory 13, speech comprehension controller 14, drive data memory 18, and drive controller 19, and by mounting cartridge 25 in the specified mounting area (not shown in the figure) of the device main unit, input speaker codebook generator 242, input speaker codebook 243, and standard speaker codebook 244 inside the cartridge become connected to speech analyzer 22 and vector quantization unit 241, as indicated by the dotted lines in FIG. 9, thereby enabling signal exchange as previously discussed.

With such a configuration, cartridge 25 can be individually owned while the device main unit can be shared among several people. In this case, an input speaker codebook can be created using the procedure described above after mounting cartridge 25 in the device main unit.

In such a configuration, if the device main unit is a remote-controllable toy, for example, the user first mounts his/her own cartridge (in which an input speaker codebook has already been created) in the device main unit, and issues a phrase such as "Go straight" to speech input unit 21 of user terminal 20. The speech signal is then sent from terminal transceiver 24, received by signal transceiver 11 of the device main unit, analyzed by speech analyzer 22, and its feature vector sequence is converted to the standard speaker's feature vector sequence as explained above and is input into phrase detector 12.

Phrase detector 12 compares the normalized feature vector sequence with the data inside reference templates memory 13, and outputs phrase detection data (word lattice) to speech comprehension controller 14.

Speech comprehension controller 14 then attempts to understand the meaning of the input speech based on the phrase detection data generated by phrase detector 12, as explained above, and outputs a corresponding in an appropriate manner (here, straight) signal. Drive controller 19 receives this signal and controls the toy such that it goes straight in this case.

As explained above, the speech input unit is separated from the device main unit, and input speech signal is sent from a signal transceiver and received by at least a receiver provided in the device main unit; and then speech recognition is performed through speech analysis and an action is taken based on the recognition result. Furthermore, input speaker codebook generator 242, reference templates memory 233, input speaker codebook 243, and standard speaker codebook 244 of speaker accommodation unit 23 are provided in cartridge 25, and this cartridge 25 is contemplated to individually owned as it contains speaker-specific information. Then, when the user of the device mounts his/her own cartridge in the device main unit for use, that user's input speech feature vector sequence is converted to the standard speech feature vector sequence, and speech recognition takes place based on this converted or normalized feature vector sequence. Therefore, the device can achieve high recognition rates without being affected by the user's voice characteristic or individual speech mannerisms.

Again, although standard speech feature reference templates memory 13 for speech recognition and reference templates memory 233 for input speaker codebook generation are provided separately in this embodiment, they need not necessarily be provided separately as shown here. For example, it is possible to use memory 13 when generating an input speaker codebook and for phrase detection. In such a case, input speaker codebook generator 242 of speaker accommodation area 23 can be configured such that it can accept data from memory 13 in a known manner.

Although an embodiment in which the invention is applied to a remote-controllable toy in connection with this 3rd embodiment, the invention is not limited in its application to this type of toy, and can naturally be applied to many other commonly used electronic instruments. Moreover, although the speech issued by a user is recognized and some action is taken in response instead of responding using speech, it is possible to have the device respond with both speech and action in response to the user's speech by providing a speech response circuit and a signal transceiver, etc. within the device main unit as discussed in connection with the first two embodiments, and by providing a signal transceiver and a speech output unit within the user terminal.

While the invention has been described in conjunction with several specific embodiments and applications, it is evident to those skilled in the art that any further alternatives, modifications and variations will be apparent in light of the foregoing description. This may include, in addition to stuffed animal toys, such as applications and embodiments as scanning machines, home electronics, computer subsystems, electronic appliances or similar devices. Thus, the invention described herein is intended to embrace all such alternatives, modifications, applications and variations as may fall within the spirit and scope of the appended claims.

What is claimed is:

1. A speech recognition device, comprising:
a data processing terminal, comprising:
a speech input unit to receive sounds including speech and translate the received speech into digital form;
a speech analyzer coupled to said speech input unit to generate voice feature parameters for the received digitized speech; and
a speaker accommodation unit comprising:
a first feature reference memory for storing pre-registered non-specific speaker feature information,
a conversion rule generated in advance highlighting variations between previously stored specific speaker feature information and the pre-registered non-specific speaker feature information, and
a feature converter for generating converted voice feature parameters received from said speech analyzer based on the conversion rule, and
a speech recognition processor, comprising:
a second feature reference memory for storing standard feature information corresponding to pre-registered phrases;
a phrase detector to determine whether the converted voice feature parameters substantially match any pre-registered phrases in said second feature reference memory and generate phrase detection data in response thereto; and
a comprehension controller coupled to said phrase detector to receive the phrase detection data, to recognize a meaning of the received speech based on the received phrase detection data, and to perform at least one of controlling an action and formulating an appropriate response responsive to the recognized meaning;
wherein said data processing terminal transmits the converted voice feature parameters to said speech recognition processor which is in radio frequency communication with said data processing terminal to receive the converted voice feature parameters.

2. The speech recognition processor of claim 1, wherein said data processing terminal includes a radio frequency transmitter coupled to said speaker accommodation unit to transmit the converted voice feature parameters to said speech recognition processor and wherein said speech recognition processor includes a complementary radio frequency receiver in radio frequency communication with said terminal transmitter to receive the converted voice feature parameters.

3. The speech recognition processor of claim 1, wherein said speaker accommodation unit further comprises a conversion rule generator for generating the conversion rule and a conversion rule memory coupled to the conversion rule generator for storing the conversion rule.

4. The speech recognition processor of claim 3, wherein said conversion rule generator and said conversion rule memory are housed in a removable cartridge in releasable communication with said data processing terminal.

5. The speech recognition processor of claim 4, wherein said conversion rule generator includes an input speaker codebook generator for generating in advance a mapping function highlighting variations between previously stored specific speaker information and the pre-registered non-specific speaker information, wherein said conversion rule memory includes a speaker codebook coupled to said input speaker codebook generator to retain the generated mapping function, and wherein said feature converter includes a vector quantization unit in communication with said speaker codebook to generate the converted voice feature parameters based on the retained mapping function.

6. The speech recognition device of claim 5, wherein said input speaker codebook generator and said speaker codebook are housed in a removable cartridge in releasable communication with said data processing terminal.

7. The speech recognition device of claim 5, wherein said speaker codebook comprises disparate input speaker and standard speaker codebooks.

8. The speech recognition device of claim 1, wherein said speech recognition processor further comprises a speech synthesizer in communication with said comprehension controller to selectively generate synthesized audio corresponding to the appropriate response formulated by said comprehension controller, and a speech output unit in communication with said speech synthesizer to audibly reproduce the synthesized audio.

9. The speech recognition device of claim 1, wherein said speech recognition processor further comprises a drive controller in communication with said comprehension controller for performing the appropriate action responsive to the recognizing meaning.

10. A speech recognition device, comprising:
a speech input unit to receive sounds including speech and translate the received speech into digital form;
a speech analyzer coupled to said speech input unit to generate voice feature parameters for the received digitized speech;
a data processing terminal including a speaker accommodation unit comprising:
  a first feature reference memory for storing pre-registered non-specific speaker feature information,
  a conversion rule generated in advance highlighting variations between previously stored specific speaker feature information and the pre-registered non-specific speaker feature information, and
  a feature converter for generating converted voice feature parameters received from said speech analyzer based on the conversion rule, and
a speech recognition processor, comprising:
  a second feature reference memory for storing standard feature information corresponding to pre-registered phrases;
  a phrase detector to determine whether the converted voice feature parameters substantially match any pre-registered phrases in said second feature reference memory and generate phrase detection data in response thereto; and
  a comprehension controller coupled to said phrase detector to receive the phrase detection data, to recognize a meaning of the received speech based on the received phrase detection data, and to perform at least one of controlling an action and formulating an appropriate response responsive to the recognized meaning;
wherein said speech analyzer transmits the voice feature parameters to said data processing terminal which is in radio frequency communication with said speech analyzer to receive the voice feature parameters.

11. The speech recognition device of claim 10, further comprising a first radio frequency transceiver coupled to said speech analyzer and said feature converter and in radio frequency communication with said data processing terminal to transmit the voice feature parameters to said terminal and receive conversion rule information therefrom, and wherein said terminal includes a complementary second radio frequency transceiver coupled to said speaker accommodation unit to enable bidirectional data exchange with said first transceiver.

12. The speech recognition device of claim 10, wherein said speaker accommodation unit further comprises a conversion rule generator for generating the conversion rule and a conversion rule memory coupled to the conversion rule generator for storing the conversion rule.

13. The speech recognition device of claim 12, wherein said conversion rule generator and said conversion rule memory are housed in a removable cartridge in releasable communication with said data processing terminal.

14. The speech recognition device of claim 13, wherein said conversion rule generator includes an input speaker codebook generator for generating in advance a mapping function highlighting variations between previously stored specific speaker information and the pre-registered non-specific speaker information, wherein said conversion rule memory includes a speaker codebook coupled to said input speaker codebook generator to retain the generated mapping function, and wherein said feature converter includes a vector quantization unit in communication with said speaker codebook to generate the converted voice feature parameters based on the retained mapping function.

15. The speech recognition device of claim 14, wherein said input speaker codebook generator and said speaker codebook are housed in a removable cartridge in releasable communication with said data processing terminal.

16. The speech recognition device of claim 14, wherein said speaker codebook comprises disparate input speaker and standard speaker codebooks.

17. The speech recognition device of claim 10, wherein said speech recognition processor further comprises a speech synthesizer in communication with said comprehension controller to selectively generate synthesized audio corresponding to the appropriate response formulated by said comprehension controller, and a speech output unit in communication with said speech synthesizer to audibly reproduce the synthesized audio.

18. The speech recognition device of claim 10, further comprising a drive controller in communication with said comprehension controller for performing the appropriate action responsive to the recognized meaning.

* * * * *